(12) United States Patent
Wickman

(10) Patent No.: US 9,049,174 B2
(45) Date of Patent: Jun. 2, 2015

(54) MAINTAINING SESSIONS IN A SMART THIN CLIENT SERVER

(75) Inventor: Glenn Ward Wickman, San Jose, CA (US)

(73) Assignee: MobileFrame, LLC, Los Gatos, CA (US)

( * ) Notice: Subject to any disclaimer, the term of this patent is extended or adjusted under 35 U.S.C. 154(b) by 359 days.

(21) Appl. No.: 13/571,269

(22) Filed: Aug. 9, 2012

(65) Prior Publication Data

US 2013/0041939 A1 Feb. 14, 2013

Related U.S. Application Data

(63) Continuation-in-part of application No. 13/470,152, filed on May 11, 2012.

(60) Provisional application No. 61/521,673, filed on Aug. 9, 2011.

(51) Int. Cl.
*G06F 15/16* (2006.01)
*H04L 29/08* (2006.01)

(52) U.S. Cl.
CPC ............. *H04L 67/04* (2013.01); *H04L 67/2895* (2013.01); *H04L 67/2842* (2013.01); *H04L 67/142* (2013.01)

(58) Field of Classification Search
CPC ... H04L 67/142; H04L 67/143; H04W 76/02; H04W 76/06
USPC .................. 709/203, 227, 228; 707/102, 120
See application file for complete search history.

(56) References Cited

U.S. PATENT DOCUMENTS

| 5,923,842 | A | 7/1999 | Pedersen et al. |
| 6,332,163 | B1 | 12/2001 | Bowman-Amuah |
| 6,564,261 | B1 | 5/2003 | Gudjonsson et al. |
| 7,035,919 | B1 | 4/2006 | Lee et al. |
| 7,289,964 | B1 * | 10/2007 | Bowman-Amuah ........... 705/1.1 |
| 7,457,878 | B1 | 11/2008 | Mathiske et al. |
| 7,685,253 | B1 | 3/2010 | Valia |

(Continued)

FOREIGN PATENT DOCUMENTS

| JP | 2000339245 A | 12/2000 |
| WO | WO-2008059535 A2 | 5/2008 |

(Continued)

OTHER PUBLICATIONS

U.S. Appl. No. 13/470,152, Examiner Interview Summary mailed Dec. 24, 2013, 3 pgs.

(Continued)

*Primary Examiner* — Frantz Jean
(74) *Attorney, Agent, or Firm* — Schwegman Lundberg & Woessner, P.A.

(57) ABSTRACT

A method for maintaining a session between a smart thin client and a smart thin client server is provided. The smart thin client server permits a user to create, manage, and deploy enterprise applications via the smart thin client but lacks the ability to save state information. The method includes detecting a log-off event for the session between the smart thin client and the smart thin client server; and saving, by the smart thin client server in a database accessible by the smart thin client server, state information for the session, in a record containing a user identification corresponding to a user of the smart thin client.

20 Claims, 9 Drawing Sheets

(56) References Cited

U.S. PATENT DOCUMENTS

| | | | |
|---|---|---|---|
| 7,788,497 | B2 | 8/2010 | Luo et al. |
| 8,341,270 | B2 | 12/2012 | Mazzaferri et al. |
| 2002/0016777 | A1 | 2/2002 | Seamons et al. |
| 2003/0105884 | A1* | 6/2003 | Upton .................... 709/318 |
| 2003/0126245 | A1 | 7/2003 | Feltin et al. |
| 2004/0199922 | A1* | 10/2004 | Krutsch et al. ............ 719/310 |
| 2004/0236860 | A1 | 11/2004 | Logston et al. |
| 2004/0240642 | A1 | 12/2004 | Crandell et al. |
| 2005/0160155 | A1* | 7/2005 | Geekee et al. ............ 709/220 |
| 2005/0256735 | A1 | 11/2005 | Bayne |
| 2006/0080468 | A1 | 4/2006 | Vadlamani et al. |
| 2006/0230438 | A1 | 10/2006 | Shappir et al. |
| 2007/0294414 | A1 | 12/2007 | Koshiba |
| 2008/0028206 | A1 | 1/2008 | Sicard et al. |
| 2008/0059496 | A1 | 3/2008 | Bell et al. |
| 2008/0126534 | A1 | 5/2008 | Mueller et al. |
| 2008/0127135 | A1 | 5/2008 | Bergstrom et al. |
| 2009/0124376 | A1 | 5/2009 | Kelly et al. |
| 2009/0254971 | A1 | 10/2009 | Herz et al. |
| 2010/0106826 | A1 | 4/2010 | Sugawara |
| 2010/0107227 | A1 | 4/2010 | Hicks |
| 2010/0175119 | A1 | 7/2010 | Vitaletti |
| 2010/0268831 | A1* | 10/2010 | Scott et al. .................... 709/228 |
| 2010/0281178 | A1 | 11/2010 | Sullivan |
| 2011/0035241 | A1 | 2/2011 | Camenisch et al. |
| 2011/0078773 | A1 | 3/2011 | Bhasin et al. |
| 2011/0307544 | A1 | 12/2011 | Lotlikar et al. |
| 2012/0023334 | A1 | 1/2012 | Brickell et al. |
| 2012/0246323 | A1 | 9/2012 | Gopinath et al. |
| 2013/0041980 | A1 | 2/2013 | Wickman |
| 2013/0042312 | A1 | 2/2013 | Wickman |
| 2014/0280771 | A1 | 9/2014 | Bosworth et al. |

FOREIGN PATENT DOCUMENTS

| | | |
|---|---|---|
| WO | WO-2013023095 A2 | 2/2013 |
| WO | WO-2013023095 A3 | 5/2013 |

OTHER PUBLICATIONS

U.S. Appl. No. 13/470,152, Final Office Action mailed Apr. 9, 2014, 34 pgs.

U.S. Appl. No. 13/470,152, Non Final Office Action mailed Aug. 30, 2013, 26 pgs.

U.S. Appl. No. 13/470,152, Response filed Jul. 1, 2013 to Restriction Requirement mailed May 31, 2013, 7 pgs.

U.S. Appl. No. 13/470,152, Response filed Dec. 30, 2013 to Non Final Office Action mailed Aug. 30, 2013, 11 pgs.

U.S. Appl. No. 13/470,152, Restriction Requirement mailed May 31, 2013, 6 pgs.

International Application Serial No. PCT/US2012/050200, International Preliminary Report on Patentability mailed Feb. 20, 2014, 8 pgs.

International Serial No. PCT/US2012/050200, International Search Report mailed Feb. 28, 2013, 4 pgs.

International Application Serial No. PCT/US2012/050200, Written Opinion mailed Feb. 28, 2013, 6 pgs.

U.S. Appl. No. 13/470,152, Examiner Interview Summary mailed Jun. 2, 2014, 3 pgs.

U.S. Appl. No. 13/470,152, Non Final Office Action mailed Oct. 27, 2014, 22 pgs.

U.S. Appl. No. 13/571,275, Non Final Office Action mailed Oct. 2, 2014, 10 pgs.

Miles, "Implementing Windows Terminal Server and Citrix MetaFrame on IBM e server xSeries Servers", International Business Machines, (Apr. 2003), 62 pgs.

U.S. Appl. No. 13/470,152, filed May 11, 2012, Authentication in a Smart Thin Client Server.

U.S. Appl. No. 13/571,275, filed Aug. 9, 2012, Deploying Applications in a Smart Thin Client Server.

\* cited by examiner

MAINTAINING SESSIONS IN A SMART THIN CLIENT SERVER

CROSS REFERENCE TO RELATED APPLICATIONS

This application is a continuation-in-part of U.S. patent application Ser. No. 13/470,152, filed on May 11, 2012, which claimed the benefit of priority under 35 U.S.C. §119(e) to U.S. Provisional Patent Application No. 61/521,673, filed on Aug. 9, 2011, both of which are incorporated herein by reference in its entirety for all purposes.

BACKGROUND

1. Technical Field

The present disclosure relates generally to enterprise solutions, and more specifically, to maintaining sessions to a thin client server website.

2. Description of the Related Art

Every business requires the completion and monitoring of various business processes. Commonly, many of these processes are performed using paper-based solutions, generally involving the completion and tracking of paper forms within an organization. The rise of mobile computing devices, however, has led to an increase in enterprise mobility solutions, where paper-based processes are replaced with wireless applications that are much more efficient. These enterprise mobility solutions, however, require custom programming.

One solution to this is to create a system where novice computer users are able to instantly create, manage, and deploy sophisticated mobile applications without the need for custom programming. All programming and synchronization complexities can be handled in the background, making them transparent to the business user.

One problem, however, with such a solution is that visitors may wish to create, manage, and deploy the mobile applications from multiple different input devices. For example, a single user may wish to start creating an application from a desktop computer at work, and then continue to create the application from a laptop computer at home. Additionally, there may be instances where a session is interrupted, such as due to a power failure or loss of network connection, where it could be beneficial to have session information maintained.

DETAILED DESCRIPTION OF SPECIFIC EMBODIMENTS

Reference will now be made in detail to example embodiments of the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In accordance with the present disclosure, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present disclosure may also be tangibly embodied as a set of computer instructions stored on a computer readable medium, such as a memory device.

In an embodiment of the present disclosure, a smart thin client server can be deployed to create, manage, and deploy enterprise applications that includes several different novel method of authentication to address these problems. In an example embodiment of the present disclosure, a session maintenance system for a smart thin client server is provided. In this embodiment, users are provided with a smart thin client, requiring very few resources or alterations on the client side. The smart thin client allows users to access hosted applications via standard browsers. Furthermore, the smart thin client does not require the storage of data on the client side, making it easier to deploy in an enterprise, where some devices may not have available storage, and where security issues may prevent the storage of additional data on a client device.

Figure 1:
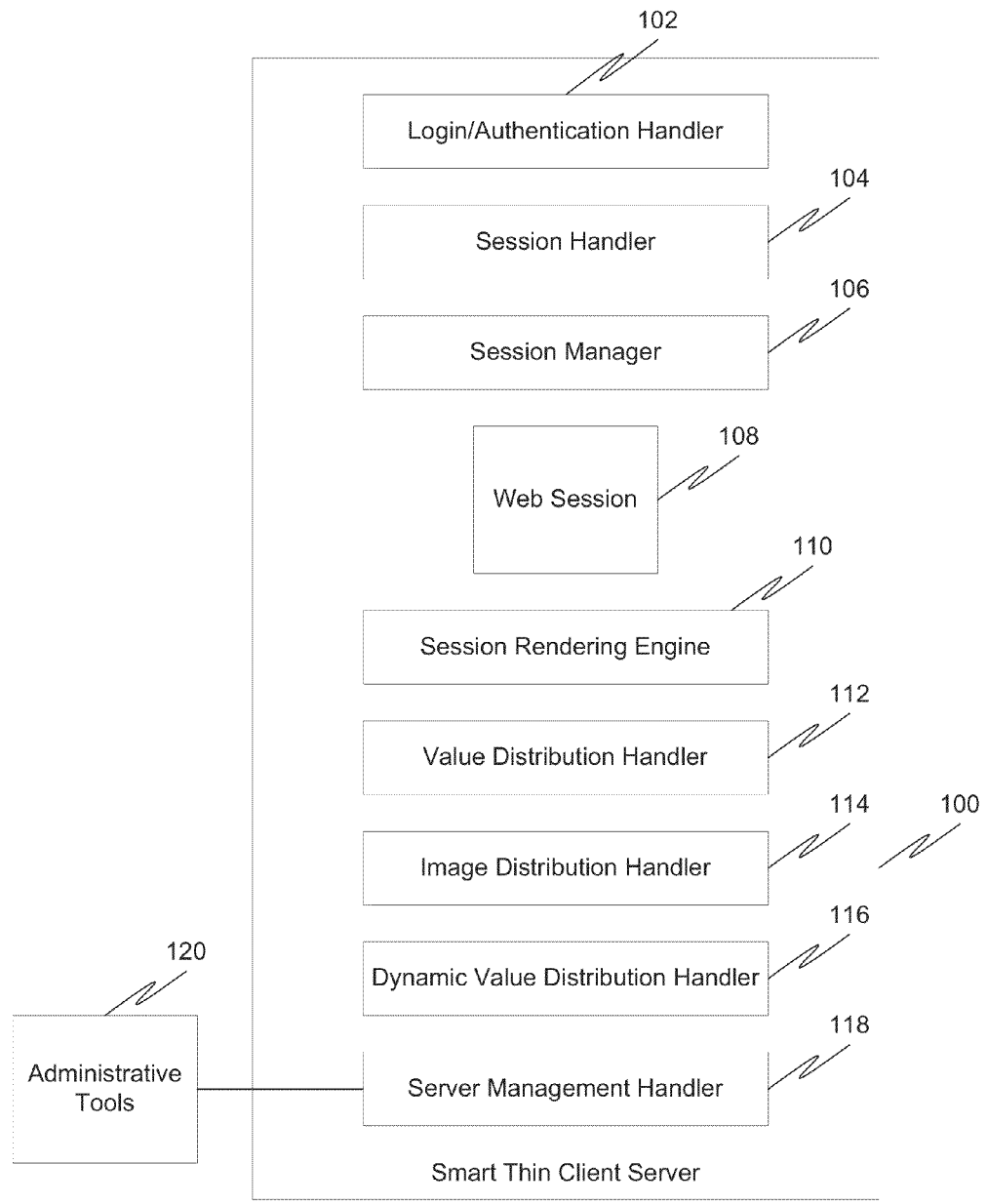
FIG. 1 is a block diagram illustrating a smart thin client server architecture in accordance with an example embodiment.

FIG. 1 is a block diagram illustrating a smart thin client server architecture in accordance with an example embodiment of the present disclosure. As will be seen in this diagram, most of the processing elements are located on the smart thin client server, freeing up resources on the device containing a smart thin client. The smart thin client server 100 may contain a login/authentication handler 102. This component generates a login page and authenticates a user along with a session manager (described later) or forwards the user to an alternate server for servicing (also described later). The smart thin client server 100 may also contain a session handler 104. This component responds to browser requests for or post backs from a rendered session. This component also confirms session validity, processes input, and returns a current session state as HTML.

The smart thin client server 100 may also contain a session manager 106. This component creates new sessions or restores existing sessions. Generally, the session manager 106 is responsible for cleanup and management of idle sessions. The smart thin client server 100 may also contain a web session 108. The web session 108 is a data structure that retains ail application data, user interface designs, and session-specific data.

Figure 2:
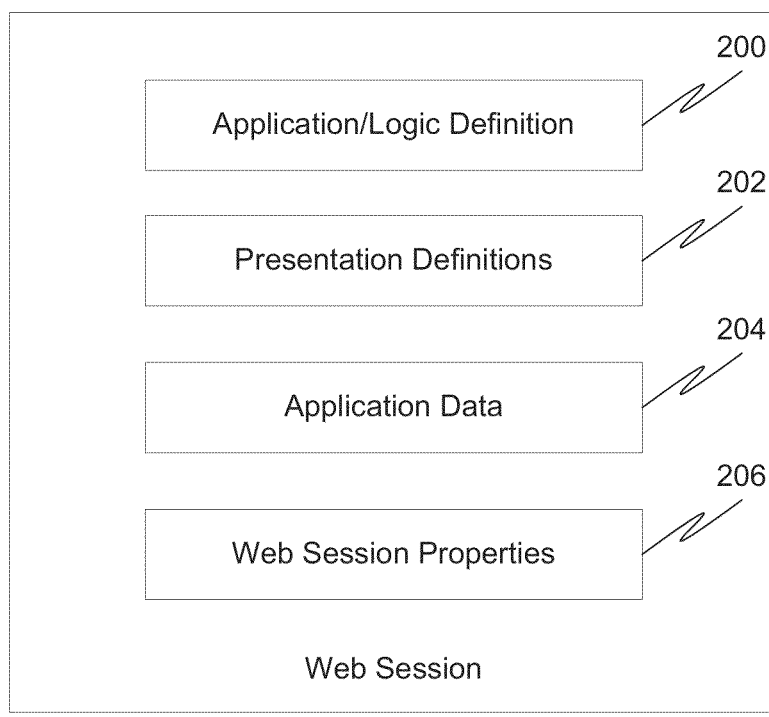
FIG. 2 is a block diagram illustrating a web session in more detail in accordance with an example embodiment.

FIG. 2 is a diagram illustrating a web session 108 in more detail in accordance with an example embodiment of the present disclosure. An application/logic definition 200 contains all fields of data, data types, and options of the values allowed. It contains all workflow (logic) flow on any events within those fields of data (changing a value for example). It also contains any global application properties as well as properties specific to individual fields.

Presentation definitions 202 contain all visual elements associated with the application presentation (user interface) for a particular device and language. Elements may or may not correspond to a field of data in the application.

Application data 204 contains all values and dynamically adjustable properties for every field of data for every instance of any application running within the user's session.

Web session properties 206 contain properties specific to a particular active web session. Examples include session/transaction tokens, database connections, browser information, last access time, etc.

Referring back to FIG. 1, the smart thin client server 100 also may contain a session rendering engine 110. This component generates and optionally optimizes the HTML that corresponds to the current page in a web session.

The smart thin client server 100 may also contain a value distribution handler 112. This component returns values from browser requests, including but not limited to rich data type values like files.

The smart thin client server 100 may also contain an image distribution handler 114. This component returns optimized images from browser requests. Images may be data in the user's session or part of the defined user interface.

The smart thin client server 100 may also contain a dynamic value distribution handler 116. This component returns partial HTML from browser requests supporting dynamic or on-demand pulling of data values.

The smart thin client server 100 may also contain a server management handler 118. This component provides a request point for managing a server via administrative tools 120. Examples include the ability to query/manage the server (i.e., start, stop, restart) and query/manage web sessions.

Figure 3:
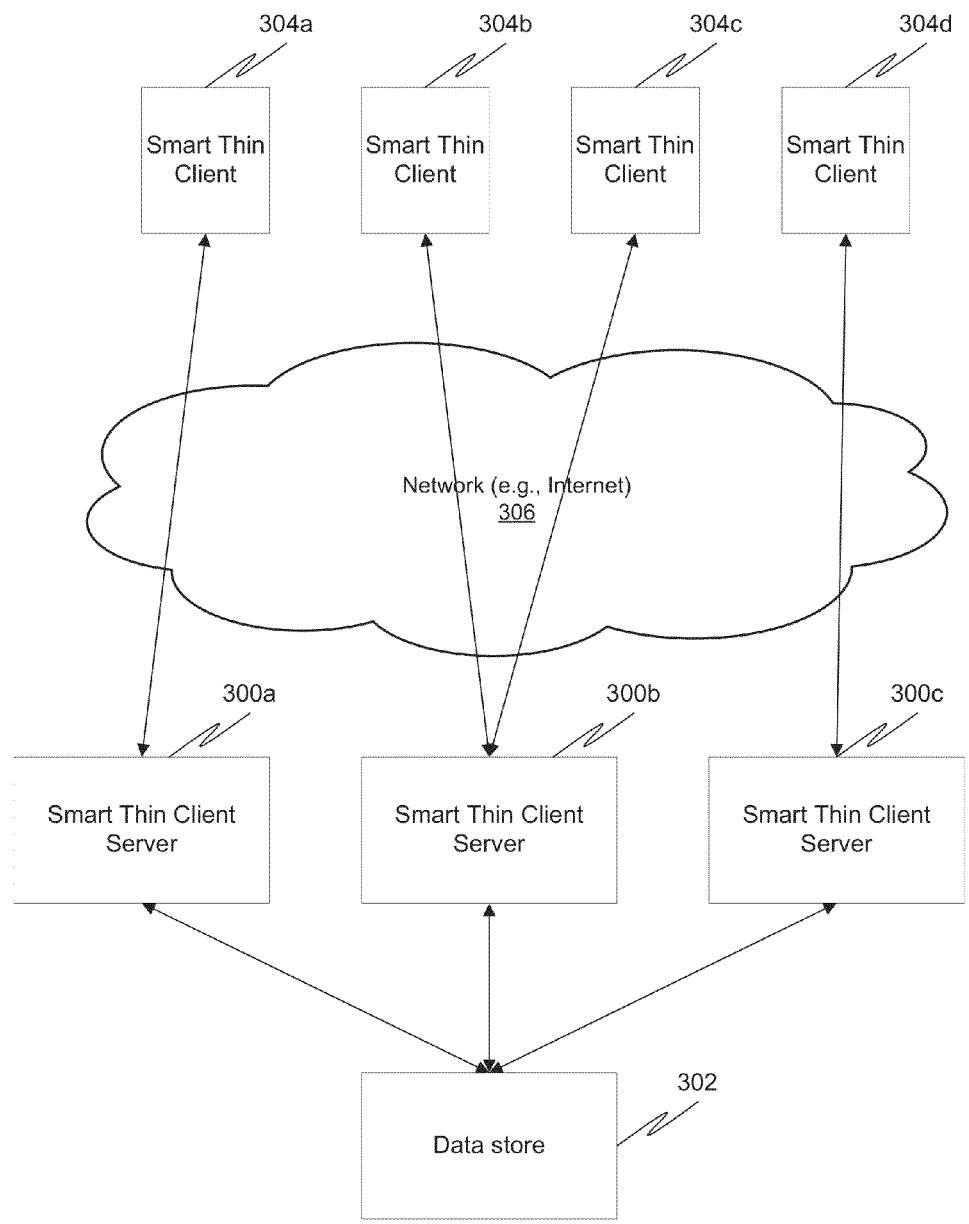
FIG. 3 is a block diagram illustrating an example embodiment of a system with multiple smart thin client servers.

A single system may have multiple smart thin client servers, in order to better balance the computing load in the system. FIG. 3 is a block diagram illustrating a system with multiple smart thin client servers. Smart thin client servers 300a, 300b, 300c all may connect to a single data store 302, such as a database. This system allows for separate web-sites for each smart thin client server, scalability/web farming, or other segregation of users and/or functionality. Also depicted are multiple smart thin clients 304a, 304b, 304c, 304c connected to various smart thin client servers 300a, 300b, 300c through computer network 306.

In another embodiment of the present disclosure, persistent state storage is provided on the server side without saving any data on the client machine. This includes cookies. When a user utilizes a named user authentication method, a virtual device is assigned to the user once the user's user name and password are authenticated. All state information is then saved on the server side as the creation, management, and deployment of apps is performed on the website.

In another embodiment of the present disclosure, the user is able to configure what state information is stored on the server. This user-configurable state storage allows the user to define which states are most important to save in a custom manner. For example, the user could specify that the state information about app authoring as well as the data the apps collect is saved. This would be different than a traditional auto-save environment, where the states saved are fixed by the developer of the website.

Another difference from the prior art is that the state information that is saved is state information about authoring the user's own applications, as well as the data that they have been collecting using those applications. As such, the result is an enterprise controlled centrally managed server maintaining state information about authoring applications.

The saving of state information allows the system to provide complete session maintenance. In one example, a user could begin a session on one device (such as a work computer) and then seamlessly continue the session on another device (such as a home computer, or a mobile device). The saving of the state information on the server allows the system to provide this functionality without requiring the saving of any information on the client computer. Additionally, there is no need for the user to manually save any session information, or even for a server to "autosave" the session information at periodic intervals, because the state information is simply always maintained by the server. Of course, for organizational purposes, the server may elect to automatically delete state information under some circumstance (e.g., the user explicitly requests to delete a session, or an administrator kicks the user off). Additionally, the state information may be transferred to a secure location on the server when it is detected that the session is still active but has been interrupted (such as when a user logs off, or there is inactivity for a preset amount of time).

The state information itself can comprise a number of different pieces of information, all configurable by the user or an administrator. This may include both application information (i.e., information about the application the user is creating or working on or with) and data (i.e., information that has been generated or modified by the application). As such, the state information as a whole may capture enough information so that the entire user experience can be backed up, including where in an application the user is, what the user has typed on screen, etc. It can be thought of as a virtual workspace that the user can leave at any point and come back to precisely where he left off. All of this can be accomplished without writing any information to the client side or requiring any affirmative action of "saving" on the part of the user. When it is necessary to store this state information for long-term storage (such as when the user logs off or a timeout occurs), the smart thin client server may serialize the state information.

Figure 4:
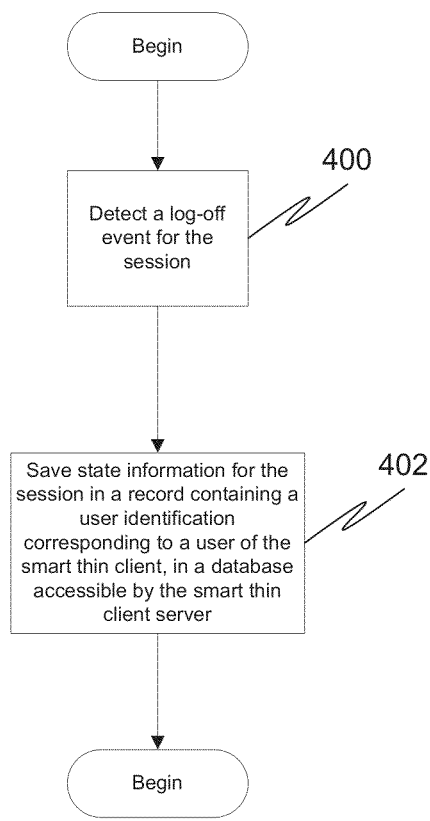
FIG. 4 is a flow diagram illustrating a method for maintaining state information in accordance with an example embodiment.

FIG. 4 is a flow diagram illustrating maintaining state information in accordance with an example embodiment of the present disclosure. At 400, a log-off event for the session between the smart thin client and the smart thin client server is detected. At 402, upon detection of the log-off event, the smart thin client server automatically saves, in a database accessible by the smart thin client server, state information for the session prior to the log-off event, in a record containing a user identification corresponding to a user of the smart thin client.

Figure 5:
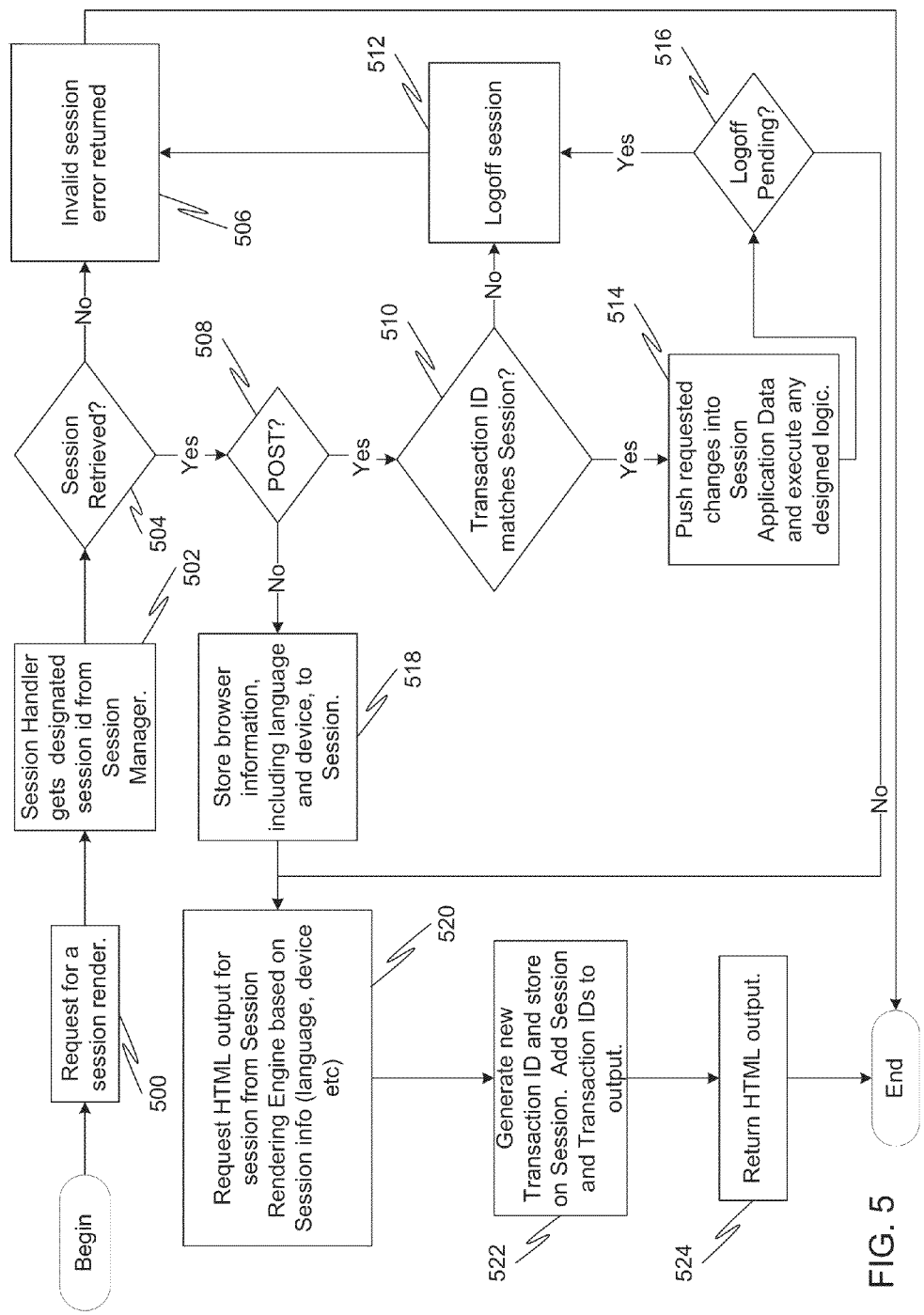
FIG. 5 is a flow diagram illustrating a method for operating a session handler in accordance with an example embodiment.

FIG. 5 is a flow diagram illustrating a method for operating a session handler in accordance with an embodiment of the present disclosure. At 500, a request for a session render is received. At 502, the session handler gets the designated session identification from the session manager. At 504, it is determined if a session was received. If not, then at 506 an error is returned. If so, then at 508 it is determined if the request is a POST request. If so, then at 510 it is determined if the transaction identification of the request matches the session. If not, then at 512 the session is logged off. This is described in more detail below. If the transaction identification matches the session, then at 514 the requested changes are pushed into session application data and any designed logic is executed. Then at 516, it is determined if there is a logoff pending. If so, then the system moves to 512 where the session is logged off. If not, the process will proceed to 520, which will be discussed in more detail below.

If at 508, it was determined that the request was not a POST request (i.e., it was a GET request), then at 518 the browser information, including language and device, may be stored in the session. At 520, HTML output for the session is requested from a session rendering engine based on session information. At 522, a new transaction identification is generated and stored on the session. The session and transaction identifications may be added to output. At 624, the HTML output is returned.

Figure 6:
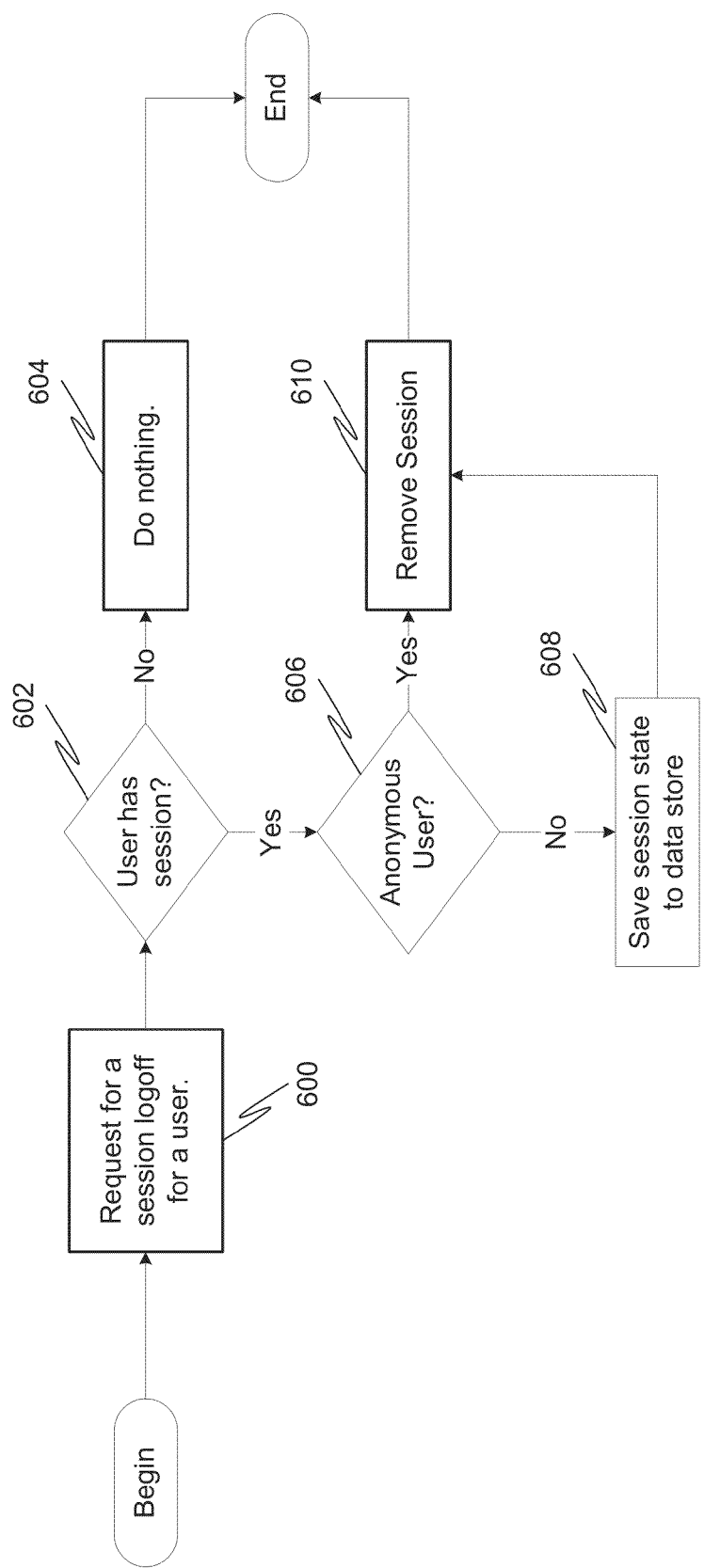
FIG. 6 is a flow diagram illustrating a method for operating a session manager in accordance with an example embodiment.

FIG. 6 is a flow diagram illustrating a method for operating a session manager in accordance with an example embodiment of the present disclosure. At 600, a request for a session logoff for a user is received. At 602, it is determined if the user has a current session. If not, then at 604 the process ends. This might occur, for example, if the session logoff request was issued in error, such as with a browser resubmit. If the user has a session, then at 606 it is determined if the user is an anonymous user. If the user is not anonymous, then the session state can be saved to a data store at 608. Following that, or if the user was an anonymous user, then at 610 the session can be removed.

Of course, the user explicitly logging off may be just one of the possible catalysts for the saving of the session state information. In another embodiment of the present disclosure, a user "time out" is detected, where there have been no session activity for a predefined amount of time (as defined by an administrator). In essence, this is an implicit log off. In another embodiment of the present disclosure, an administrator can forcibly log off a user via a remote console. In another embodiment of the present disclosure, the thin client server may receive a shut down: notice from an operating system where ail users must be logged off and session state information stored. Lastly, in an embodiment of the present disclosure, as part of an application workflow logic, the application itself can issue an explicit request to save the state information.

A user ID can be used to save a record for the session that includes the state information. The actual storage of the web session state information can be performed using a variety of different mechanisms. In one embodiment of the present disclosure, a web session table is utilized. The web session table as a column for the user ID as well as session bytes (a binary large object bytes (BLOB) column). Each record in this table represents a user's web session state. The user column may be the primary key, because there is only one state per user. Records can then be read from or written to this table. In that manner, all sessions are centrally stored and secured, regardless of how many actual thin client servers are actually operating.

In another embodiment of the present disclosure, the state information can be stored in simple files, using the user ID as the name of each file. Alternatively, a dedicated session server may be utilized, eliminating the need for a database.

The state information stored may be reflective of the fact that the web session itself is essentially a mini-virtual machine that includes apps (current or on hold), pending data, and user preferences. The web session is an object that contains everything a user is working on. The web sessions can then be serialized into byte form.

Thus, in one embodiment of the present disclosure, a user's web session is stored by first serializing the user's session to bytes, and then inserting or updated the web sessions table with the bytes corresponding to the user ID.

Restoring the session then involves finding the user ID in the web sessions table, obtaining the bytes for the user id, and deserializing them back into an instantiated web session. If there were no bytes found, then the session is a new session and a new object instances is created for the user.

In an embodiment of the present disclosure, every thin client server web session has an associated client ID. The client session ID identifies the web session. This client session ID can then be used to pass as a parameter for certain function calls. For example, a user can use a URL operation on the platform to redirect the user to a different web server, and the client session ID can be passed as a parameter to this operation in order to identify the session to redirect to return back, the client session ID can be passed between any applications on the platform, even user defined applications, allowing a degree of flexibility not found in prior art solutions.

Figure 7:
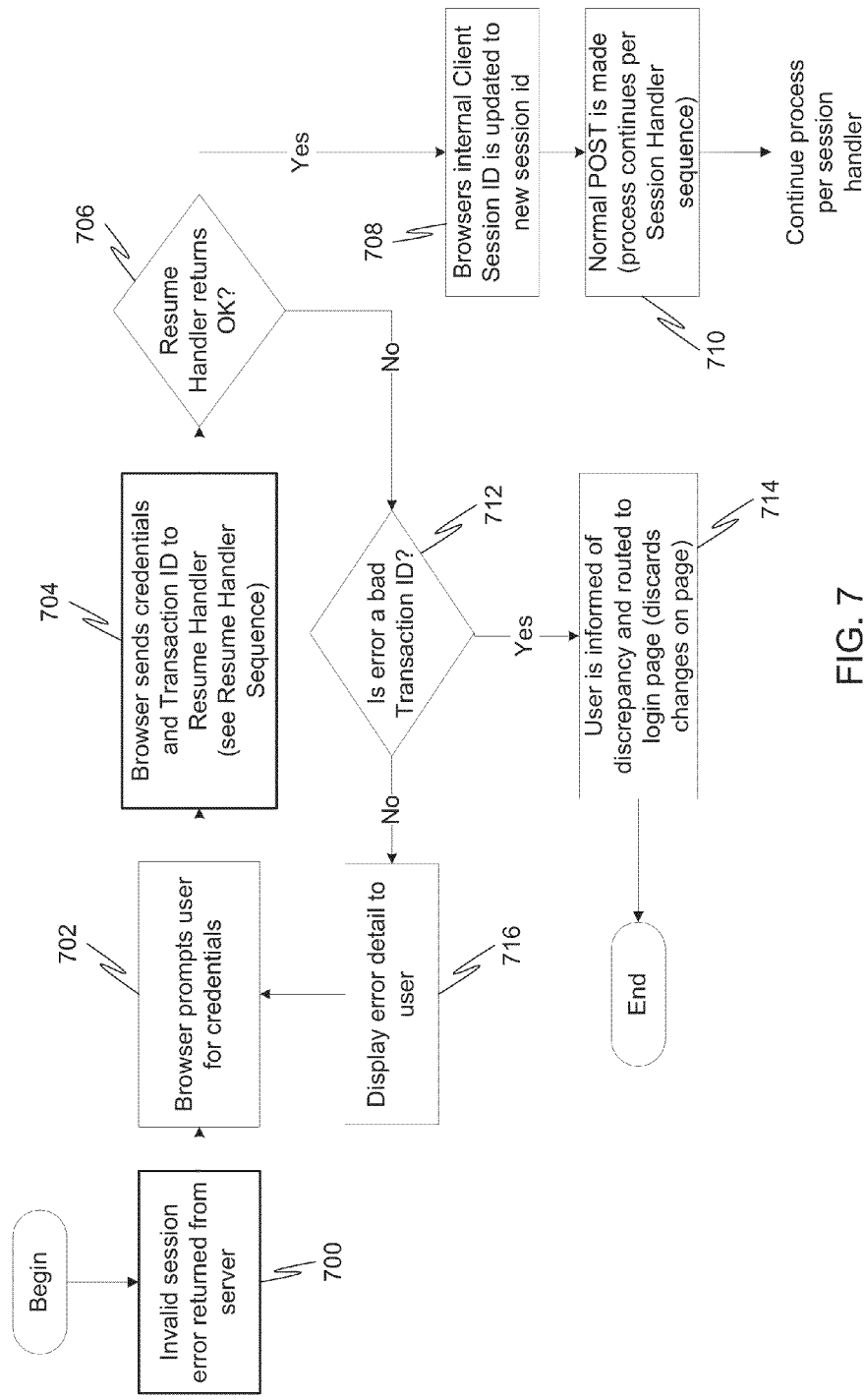
FIG. 7 is a flow diagram illustrating a method for securely resuming a session in accordance with an example embodiment.

In another embodiment of the present disclosure, a sequence is provided that allows the system to securely resume a session that was logged off due to idle time or disconnected from the server. FIG. 7 is a flow diagram illustrating a method for securely resuming a session in accordance with this embodiment of the present disclosure. In such a case, an invalid session error is returned from the server at 700. At 702, the browser then prompts the user for credentials. At 704, the browser sends the credentials and the transaction ID to the resume handler sequence. The resume handler sequence will be described later with respect to FIG. 8. At 706, it is determined if the resume handler returns an "OK". If so, then at 708 the browser's internal client session ID is updated to a new session ID. Then at 710, a normal POST operation is made (and the process continues per the session handler sequence).

If at 706, it is determined that the resume handler did not return an "OK", then at 712 it is determined if the error is a bad transaction ID. If so, then the user is informed of the discrepancy and routed to the login page (at which point the changes on the page are discarded) at 714. If not, then at 816 the error detail is displayed to the user.

Figure 8:
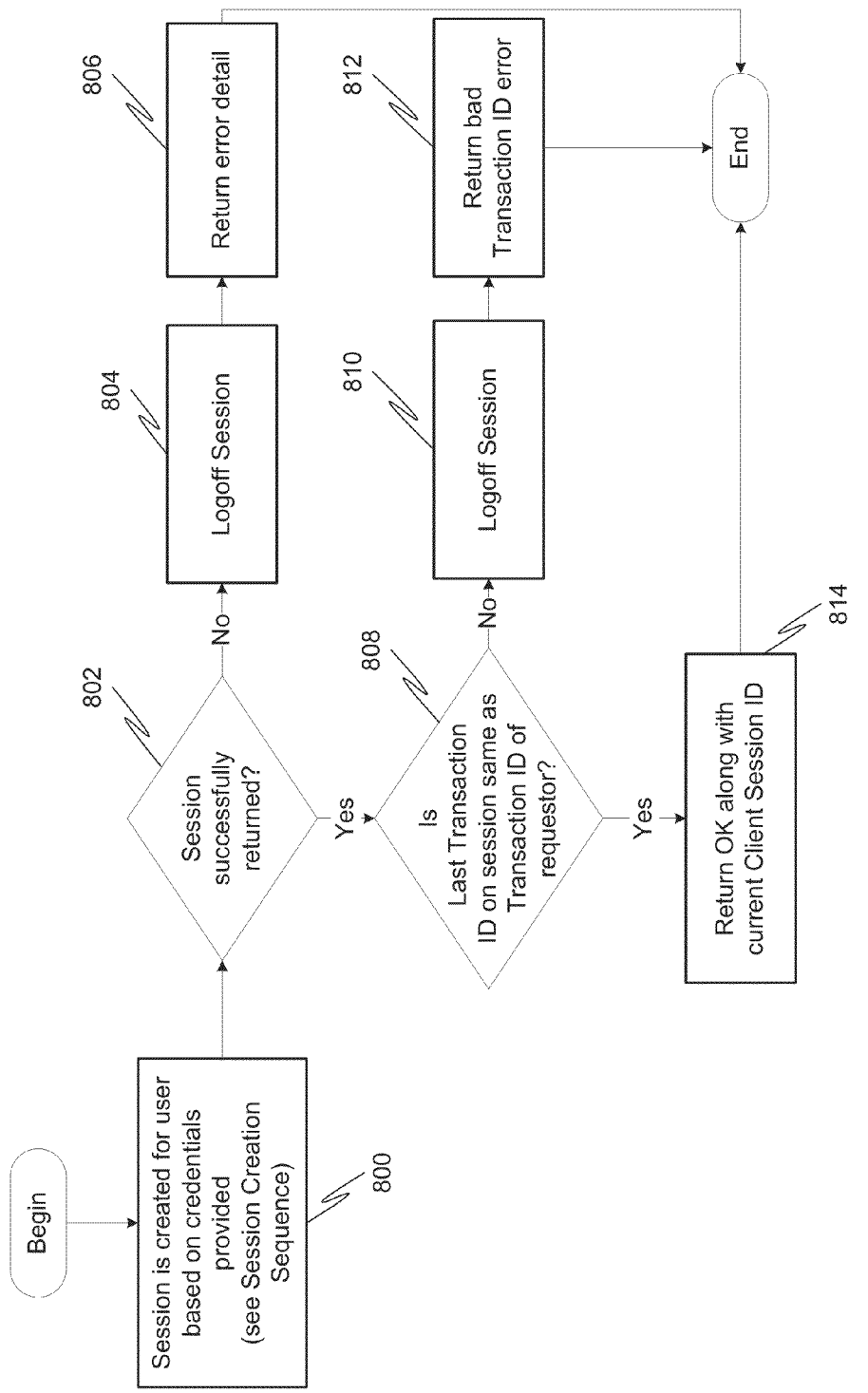
FIG. 8 is a flow diagram illustrating a method for handling the resuming of a session in accordance with an example embodiment.

FIG. 8 is a flow diagram illustrating a method for handling the resuming of a session in accordance with an embodiment of the present disclosure. Here, at 800, a session is created for the user based on credentials provided. Then, at 802, it is determined if a session is successfully returned. If not, then at 804 the session is logged off and at 806 error details are returned. If so, then at 808 it is determined if the last transaction ID on the session the same as the transaction ID of the requester. If not, then at 810 the session is logged off and at 812 a bad transaction ID error is returned. If so, then at 814, an "OK" is returned along with the current client session ID.

Figure 9:
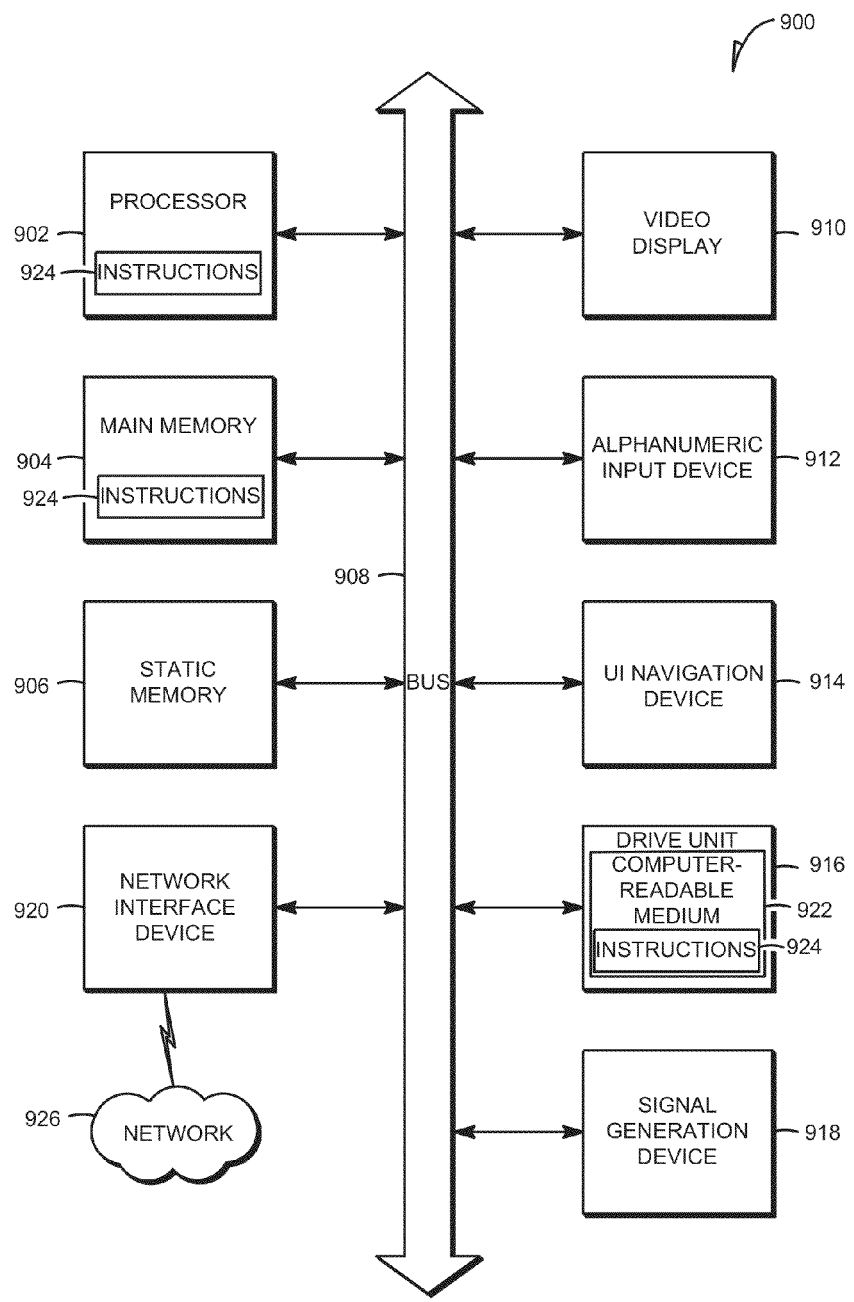
FIG. 9 shows a diagrammatic representation of a machine in the example form of a computer system within which a set of instructions may be executed to cause the machine to perform any one or more of the methodologies discussed herein.

FIG. 9 shows a diagrammatic representation of a machine in the example form of a computer system 900 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a UI navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, with the main memory 904 and the processor 902 also constituting machine-readable media.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding or carrying a set of instructions for execution by the machine and that cause the machine to perform any one or more of the methodologies of the present description or that is capable of storing, encoding or carrying data structures utilized by or associated with such a set of instructions. The term "machine-readable medium" shall accordingly be taken to include, but not be limited to, solid-state memories, optical media, and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

Although only a few embodiments of the disclosure have been described in detail, it should be appreciated that the disclosure may be implemented in many other forms without departing from the spirit or scope of the disclosure. Therefore, the present embodiments should be considered illustrative and not restrictive and the disclosure is not to be limited to the details given herein, but may be modified within the scope and equivalents of the appended claims.

What is claimed is:

1. A method for maintaining a session between a smart thin client and a smart thin client server, the method comprising:
   creating a web session between the smart thin client server and the smart thin client server, the web session containing state information, the smart thin client server permitting a user to create, manage, and deploy enterprise applications on the smart thin client server via the smart thin client, the smart thin client preventing the saving of state information for the web session on the smart thin client;
   storing the web session on the smart thin client server;
   receiving user input at the smart thin client server from the smart thin client;
   modifying the state information based on the user input;
   detecting a log-off event for the web session between the smart thin client and the smart thin client server; and
   in response to the detecting of the log-off event, automatically saving, by the smart thin client server in a database accessible by the smart thin client server, state information for the web session, in a record containing a user identification corresponding to the user of the smart thin client.

2. The method of claim 1, wherein detecting further comprises:
   detecting a user explicitly logging off of the session.

3. The method of claim 1, wherein detecting further comprises:
   detecting a lack of activity of a user of the smart thin client.

4. The method of claim 1, wherein detecting further comprises:
   detecting a shut-down notice from an operating system of the smart thin client.

5. The method of claim 1, wherein detecting further comprises:
   detecting an explicit request to log-off from an enterprise application managed by the smart thin client server.

6. The method of claim 1, wherein the state information saved by the smart thin client server is configurable by a user of the smart thin client.

7. The method of claim 1, wherein the state information includes application authoring state and state of variable for data collected by applications managed by the smart thin client server on behalf of the smart thin client.

8. The method of claim 1, wherein the smart thin client is unable to store cookies.

9. The method of claim 1, wherein the state information includes information about what a user has typed on the screen of a computer.

10. A smart thin client server for communication with one or more smart thin clients, the smart thin client server comprising:
   a memory to store a web session corresponding to a session between the smart thin client server and the one or more smart thin clients;
   a session rendering engine executable by one or more processors and configured to cause the session to be rendered on a smart thin client;
   a session manager executable by one or more processors and configured to create a web session between the smart thin client server and the smart thin client server, the web session containing state information, the smart thin client server permitting a user to create, manage, and deploy enterprise applications on the smart thin client server via the smart thin client, the smart thin client configured to prevent the saving of state information for the web session on the smart thin client, store the web session on the smart thin client server, detect a log-off event for the session, and to, in response to the detecting of the log-off event for the session, save state information for the web session, in a record containing a user identification corresponding to the user; and
   the session rendering engine further configured to receive user input from the smart thin client and modify the sate information based on the user input.

11. The smart thin client server of claim 10, wherein the web session includes:
   an application/logic definition;
   one or more presentation definitions;
   application data; and
   web session properties.

12. The smart thin client server of claim 10, wherein detecting includes detecting a user explicitly logging off of the session.

13. The smart thin client server of claim 10, wherein detecting further comprises:
   detecting a lack of activity of a user of the smart thin client.

14. The smart thin client server of claim 10, wherein detecting further comprises:
   detecting a shut-down notice from an operating system of the smart thin client.

15. The smart thin client server of claim 10, wherein detecting further comprises:
   detecting an explicit request to log-off from an enterprise application managed by the smart thin client server.

16. The smart thin client server of claim 10, wherein the state information saved by the smart thin client server is configurable by a user of the smart thin client.

17. The smart thin client server of claim 10, wherein the state information includes application authoring state and state of variable for data collected by applications managed by the smart thin client server on behalf of the smart thin client.

18. The smart thin client server of claim 10, wherein the smart thin client is unable to store cookies.

19. The smart thin client server of claim 10, wherein the state information includes information about what a user has typed on the screen of a computer.

20. A non-transitory computer-readable storage medium storing a set of instructions that, when executed by a processor, cause the processor to perform operations, comprising:
   creating a web session between the smart thin client server and the smart thin client server, the web session containing state information, the smart thin client server permitting a user to create, manage, and deploy enterprise applications on the smart thin client server via the smart thin client, the smart thin client preventing the saving of state information for the web session on the smart thin client;
   storing the web session on the smart thin client server;
   receiving user input at the smart thin client server from the smart thin client;
   modifying the state information based on the user input;
   detecting a log-off event for the web session between the smart thin client and the smart thin client server; and
   in response to the detecting of the log-off event, automatically saving, by the smart thin client server in a database accessible by the smart thin client server, state information for the web session, in a record containing a user identification corresponding to the user of the smart thin client.

* * * * *